Dec. 25, 1934.  R. W. JACKSON  1,985,412
PORTABLE BAR
Filed Jan. 29, 1934   2 Sheets-Sheet 1

ROBERT W. JACKSON
INVENTOR

PER Albert J. Fihe
ATTORNEY

Dec. 25, 1934.    R. W. JACKSON    1,985,412
PORTABLE BAR
Filed Jan. 29, 1934    2 Sheets-Sheet 2
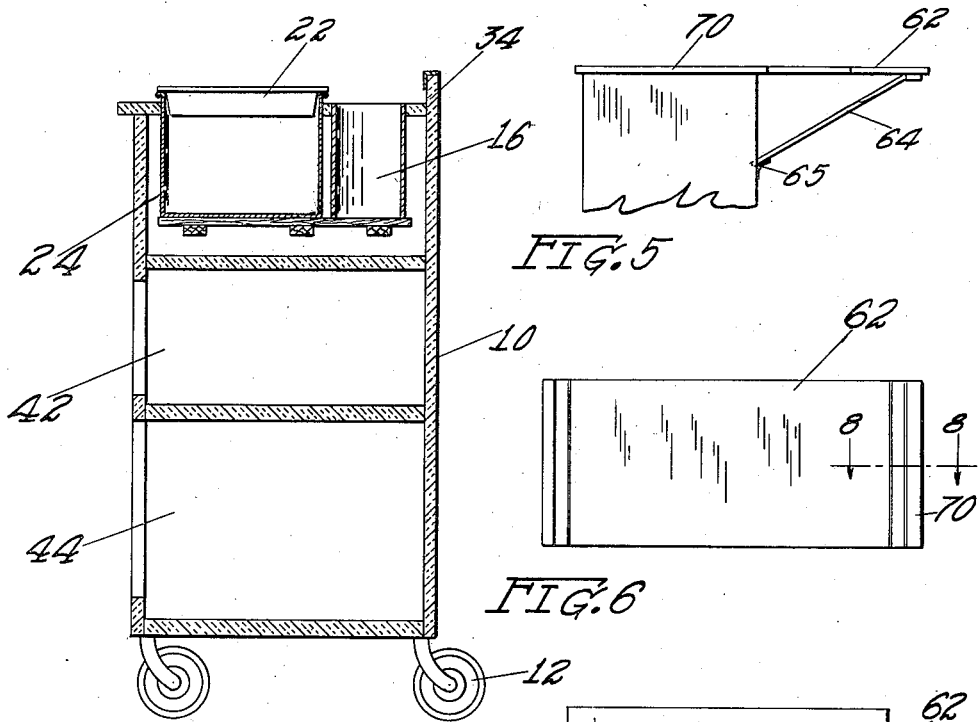
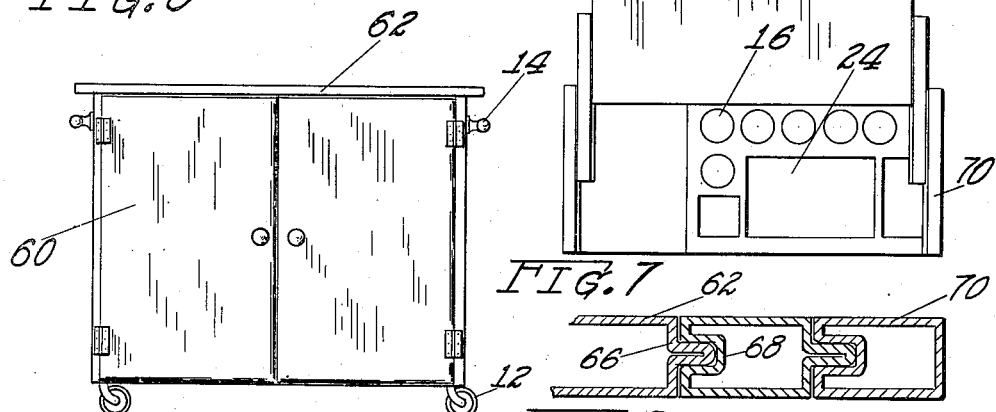
ROBERT W. JACKSON
INVENTOR
PER Albert J. Fike
ATTORNEY Patented Dec. 25, 1934

1,985,412

UNITED STATES PATENT OFFICE 1,985,412

PORTABLE BAR

Robert W. Jackson, Evanston, Ill., assignor to The Brunswick-Balke-Collender Company, Chicago, Ill., a corporation of Delaware Application January 29, 1934, Serial No. 708,748

1 Claim. (Cl. 296—24)

This invention relates to an improved portable bar and has for one of its principal objects the provision of a portable article of furniture in the shape of a bar, wherein drinks of all kinds can be conveniently mixed and made up.

One of the important objects of this invention is the provision of a portable bar for use in mixing and serving drinks which has, in one unit, provision for the storage of bottles, glasses, cocktail shakers, bottle openers, and also all ingredients which go into the mixing of modern and old-fashioned drinks.

Another important object of the invention is to provide a portable bar for serving drinks and the like which can, if desired, be completely enclosed in a casing having doors and a shiftable top whereby when the device is open it is immediately ready for the convenient mixing and dispensing of drinks and also some foods, and when it is closed it appears merely as a cabinet or other article of furniture.

Other and further important objects of the invention will be apparent from the disclosures in the accompanying drawings and following specification.

The invention, in a preferred form, is illustrated in the drawings and hereinafter more fully described.

In the drawings—

Figure 3 is a sectional view taken on the line 3—3 of Figure 2, looking in the direction indicated by the arrows.

Figure 4 is an elevational view showing the closed type of bar.

Figure 5 is an end view of the closed type, showing the lid pushed out to form a serving table.

Figure 6 is a top plan view of the closed type of bar shown in Figure 4, with the cover in closed position.

Figure 7 is a top plan view similar to Figure 6 but showing the cover in open position.

Figure 8 is a sectional view taken on the line 8—8 of Figure 6, looking in the direction indicated by the arrows.

As shown in the drawings—

Figures 1, 2:
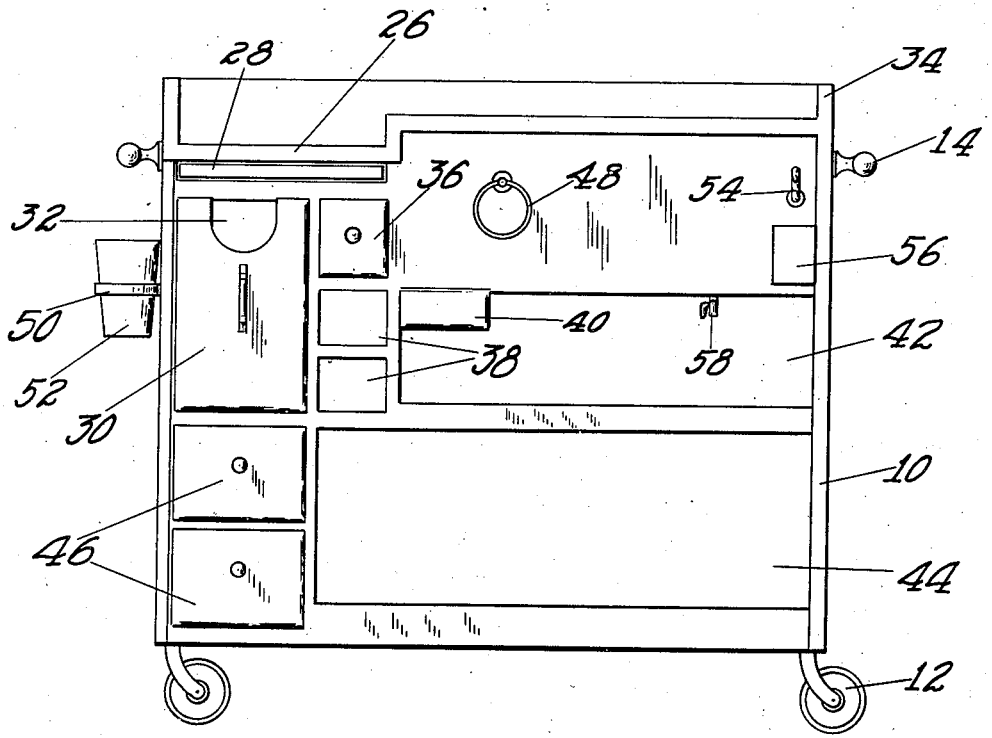
Figure 1 is an elevation of the improved portable cocktail bar of this invention.
Figure 2 is a top plan view of the bar, showing the various compartments and combined mixing and serving table.

The reference numeral 10 indicates generally a casing or housing for the improved portable bar of this invention, which housing may be of either metal or wood or some other suitable material, and which is provided with a set of swivel, rubber-tired rollers 12, and a pair of handles 14, whereby the same can be readily propelled from place to place as desired or necessary.

In the top of the bar there are, preferably, six circular set-up rack openings, as best shown at 16 in Figure 2, these being provided for the insertion of bottles; and there is also a square container 18 for muddler, spoons, squeezer, and strainer.

A space 20 is provided for Seltzer bottles and adjacent this space is a shiftable tray 22 for fresh-cut fruit, which tray is positioned above but not wholly covering a receptacle 24 which is the ice cube compartment. The fruit tray 22 can be pushed from one side to the other so as to allow convenient access to ice in the compartment 24, the presence of which ice also provides cooling for the bottles in compartments 16 and 20 and also for the fruit in the tray 22.

Adjacent the bottle rack and ice compartment is a work-board 26, which, as best shown in Figure 1, is at a slightly less height than the remainder of the bar, this being to assure easy working position. Directly beneath this work-board 26 is a sliding cutting-board 28, preferably of wood, and which constitutes a convenient location for the cutting up of fruits or for the making of small sandwiches, and hors-d'oeuvres, etc. A generous size jar 30 is provided beneath the work and cutting boards, for refuse, scraps, and left-overs, this being provided with an opening 32 whereby the same is readily accessible.

All of the top board space is surrounded by a protective ledge 34, as shown in Figures 1 and 3.

A sugar drawer 36 is also provided in the face of the bar, this sugar drawer preferably having a round bottom and being metal lined, and ordinarily comprising two or three compartments for granulated, lump, or powdered sugar, as desired.

Directly beneath the sugar drawer are two open utensil shelves 38, and adjacent these shelves is a metal lined egg drawer 40 which takes up a portion of an upper storage shelf or space 42, there being also a lower shelf or space 44. The upper space can be used for glasses, cups, and the like, and the lower space is preferably adapted for the storage of additional, reserve, and empty bottles.

Two drawers for whole fruit such as lemons, oranges, and the like are provided at 46; there also being a towel ring at 48; racks 50 for cocktail shakers 52; and a combination corkscrew, cap puller and receptacle at 54 and 56, respectively.

A suitable draincock 58 is provided for the ice compartment 24.

The handles 14 may also, of course, be used for towel rings if desired. And both shaved ice and ice cubes may obviously be placed in the ice compartment 24.

The bottle cap and cork receptacle 56 may be removed for emptying.

The refuse drawer 30 is easily removed for quick, ready, and sanitary disposal of any collected material.

As shown in Figure 4 the entire face of this portable bar may be closed with hinged or sliding doors 60, and the top may be covered as at 62, this cover being preferably made in slidable sections, as best shown in Figure 6, whereby the same may be drawn out or extended as illustrated in Figure 7 to provide free access to the various compartments 16 and 24, etc., in the top of the portable bar.

This extended top 62 is preferably supported by means of brackets or the like 64 so that the same may be actually used as a dispensing table or bar, and which, accordingly, will be sufficiently strong to sustain any reasonable weight placed thereon. The brackets 64 are preferably hinged, as shown at 65, and when dropped down are preferably received into suitable grooves provided for their reception, so that the same will be flush with the outer surface of the housing when not in use.

Obviously certain accessories, such as the shaker supports 50, will necessarily have to be eliminated from the outer surface of the housing 10 if the same is developed into the closed cabinet type.

Details of the slidable cover 62 are illustrated in sectional Figure 8, the inner sections being provided with integral extensions 66 which fit into suitable notches 68 formed in adjacent portions, the outside element 70 being preferably fixed. Obviously some other and different type of cover or top may be provided as desired or convenient.

It will be evident that herein is provided a portable bar which meets a definite need for the mixing of various drinks for quick serving to customers or guests, and its portability together with its compactness and completeness assures entire satisfaction.

I am aware that many changes may be made and numerous details of construction varied throughout a wide range without departing from the principles of this invention, and I therefore do not purpose limiting the patent granted thereon otherwise than as necessitated by the prior art.

I claim as my invention:—

A portable bar, comprising a housing including a plurality of compartments, swivel supporting wheels for said housing, a set of doors and a shiftable top for the housing, said shiftable top adapted to be opened forwardly to comprise a serving bar, and collapsible supports for the top when in open position, certain of the compartments being positioned in the upper surface and other compartments positioned in the lower portions of the housing; certain of the compartments of the upper portion of the housing comprising circular receptacles, for bottles, and certain other compartments comprising receptacles for ice; the bottle compartment surrounding the ice receptacle whereby all of said compartments are cooled by the ice in the receptacle; a draincock for the ice compartment; a workboard forming part of the said upper surface; and a sliding cutting-board mounted beneath the workboard.

ROBERT W. JACKSON.